United States Patent

Albrecht

[15] 3,638,369

[45] Feb. 1, 1972

[54] DEVICE FOR PREVENTING THE CLOGGING OF GUTTERS AND DOWNSPOUTS

[72] Inventor: Robert E. Albrecht, 77 Thorncliff, St. Louis, Mo. 63122

[22] Filed: Oct. 22, 1970

[21] Appl. No.: 82,941

[52] U.S. Cl................................52/16, 15/104.3, 15/246, 15/249
[51] Int. Cl.........................................E04d 13/00
[58] Field of Search................15/104.05, 104.1, 104.3, 246, 15/249, 243, 93; 126/16; 52/12, 16

[56] References Cited

UNITED STATES PATENTS

| 1,040,728 | 10/1912 | Miyamoto | 15/249 |
| 2,523,435 | 9/1950 | Jones | 52/16 |

Primary Examiner—Edward L. Roberts
Attorney—Rogers, Ezell, Eilers & Robbins

[57] ABSTRACT

This invention comprises a device for preventing the clogging of gutters and downspouts with leaves and other debris and includes an auger means which extends into the mouth of the downspout, and means responsive to the wind for rotating the auger means within the mouth of the downspout in a direction to drive the leaves and other debris downward through the downspout.

12 Claims, 5 Drawing Figures

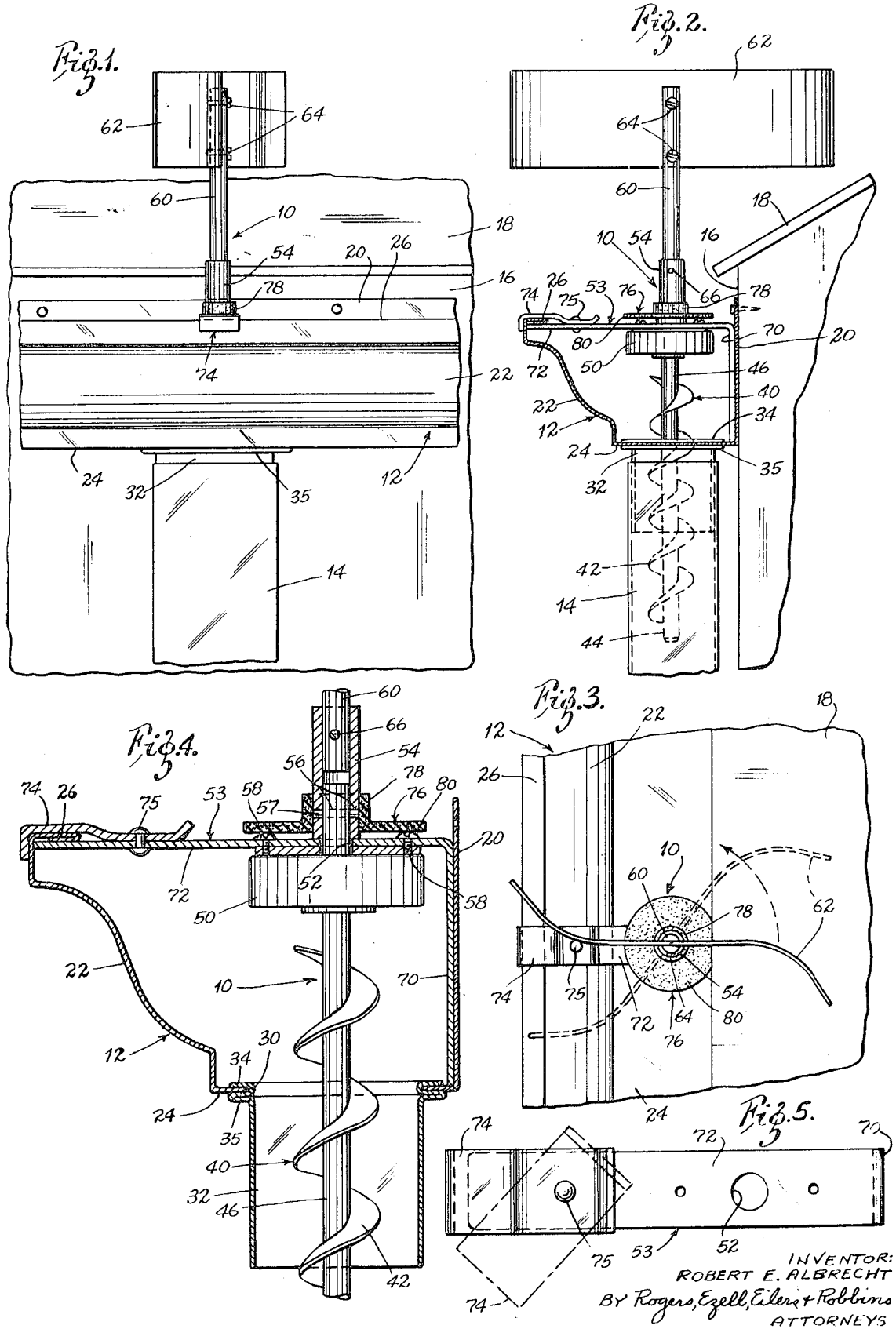

DEVICE FOR PREVENTING THE CLOGGING OF GUTTERS AND DOWNSPOUTS

BACKGROUND OF THE INVENTION

A common problem in the maintenance of homes and other buildings is the accumulation of leaves and other forms of debris in the guttering around the roof of the building at the mouth of the downspouts, thus preventing the flow of water out of the gutters and down through the downspout. The result is that the gutters overflow to produce precisely that condition which the gutters are designed to prevent, that is, the uncontrolled drainage of water off the roof onto the ground surrounding the building.

This problem is particularly acute in the fall when the trees shed their leaves and the wind blows the leaves onto the roofs and into the gutters of the building. The rainwater washes the leaves to the mouth of the downspouts where they accumulate to clog the downspout.

Probably the most common technique for preventing clogging has been to climb up to the gutter and manually remove the debris. With multiple-story buildings this technique is not only very troublesome and inconvenient, but also extremely dangerous.

Another technique has been the use of devices, such as a screen device inserted in the mouth of the downspout to allow water to flow despite the accumulation of debris. The drawbacks of this type of device are that it does not prevent accumulation of the debris and the screen clogs making the device inoperative. Another type of device was designed to prevent clogging by keeping the leaves and other debris away from the mouth of the downspout. However, the leaves remain in the gutter to accumulate and eventually clog.

Hence, it is desirable to have a relatively inexpensive device that is easily mounted in the gutter at the mouth of the downspout and prevents the accumulation of leaves and other debris in the gutter and at the mouth of the downspout. This invention is such a device.

SUMMARY OF THE INVENTION

The device of this invention is primarily designed to drive the debris which tends to accumulate at the mouth of a downspout downward through the downspout so that the rainwater can wash the debris out the bottom of the downspout.

The device includes an auger portion extending down into the upper portion of the downspout and slightly above the bottom of the gutter. The upper end of the auger portion is mounted by a bearing means to a bracket for mounting the device to the gutter. A shaft extends upwardly from the bearing means, this shaft being directly attached to the auger means so that rotation of the shaft imparts direct rotation to the auger means. An impeller is secured to the upper end of the shaft. A rubber shield is also provided to protect the bearing from rain, sleet, snow and the like.

As wind strikes the impeller causing the impeller to rotate in a selected direction, rotation is also imparted to the shaft and the auger means in that same direction. By appropriately selecting the direction of rotation, any debris that comes in contact with the auger means is forced downward through the mouth of the downspout, allowing the rainwater to wash the debris out the bottom.

DESCRIPTION OF THE DRAWINGS

FIG. 1 is a front elevational view of the device of this invention shown in combination with a gutter and downspout mounted on the side of a building;

FIG. 2 is a side elevational view of the invention as shown in FIG. 1 showing the gutter in section;

FIG. 3 is a plan view of the invention as shown in FIG. 2;

FIG. 4 is an enlarged view of the invention as shown in FIG. 2 exclusive of the downspout and the extreme upper and lower ends of the device; and FIG. 5 is a plan view of the mounting bracket of this invention.

DETAILED DESCRIPTION OF THE PREFERRED EMBODIMENT

In the drawings, the device 10 of this invention is shown in combination with a gutter 12 and a downspout 14. The gutter 12 is mounted to the side 16 of a building just beneath the roof 18. The gutter 12 is of a type commonly known in the art for catching water flowing from the roof of the building, the gutter having a backwall 20, a front wall 22 and a bottom portion 24. The front wall 22 of the gutter 12 extends from the front edge of the bottom portion 24 diagonally upward and forward as best shown in FIGS. 2 and 4, with the upper end of the front wall 22 forming a rearward flange 26. An aperture 30 is located in the bottom portion 24 through which is mounted a fitting 32, having an upper flange 34 and a lower flange 35. The perimeter of the aperture 30 is held between the flanges 34 and 35 thus holding the fitting 32. The fitting 32 and downspout 14 can be of a variety of cross sections such as, for example, round, oval or rectangular. The upper portion of the downspout 14 fits over the fitting 32.

The device 10 has an auger 40 which extends downward through the aperture 30 and fitting 32 into the upper portion of the downspout 14, and preferably with its blade 42 extending above the bottom 24 of the gutter 12 as well as substantially to the lower end 44 of its shaft 46.

Referring to FIG. 4, the upper end of the shaft 46 extends through a bearing 50, an aperture 52 in a mounting bracket 53, and partially into a sleeve 54, the sleeve 54 and shaft 46 having an aperture 56 extending there through to receive a pin 57 for securing the shaft 46 to the sleeve 54. The bearing 50 is secured to the mounting bracket 53 by any suitable means such as screws 58.

The lower end of a shaft 60 extends part way into the sleeve 54 with the upper end of the shaft 60 extending well above the top of the gutter 12. An impeller 62 is mounted to the upper end of the shaft 60 by any suitable means such as screws 64. The impeller 62 is of any suitable type that imparts rotation to the auger portion 40 as it is struck by the wind. A pin 66 extends through the lower end of the shaft 60 and the sleeve 54 to secure the shaft 60 to the sleeve 54.

As best shown in FIG. 3, the impeller 62 described in this embodiment is a generally S-shaped fin, although other suitable types of impellers could be used. The impeller 62 is designed for use with the right-hand screw auger 40 to produce a counterclockwise rotation when struck by the wind from any horizontal direction. Where a left-hand screw auger is used the impeller should be designed to produce clockwise rotations.

The bracket 53 is generally L-shaped, having a vertical portion 70 and a horizontal portion 72. The shaft 46 of the auger portion 40 extends through the horizontal portion 72 of the bracket 53 directly above the center of the aperture 30. With the vertical portion 70 positioned directly adjacent the backwall 20 of the gutter 12, the horizontal portion 72 extends across the top of the gutter 12 with its left end positioned beneath the flange 26. A locking member 74 has one end pivotally mounted at 75 to the horizontal portion 72 of the bracket 53 as best shown in FIGS. 2 and 4. The other end of the locking member 74 is formed to fit over the top and a slightly down over the front of the flange 26 to lock the bracket to the gutter 12.

A shield 76 having a neck portion 78 and disk portion 80 surrounds the sleeve 54 just above the bearing 50 with the neck portion 78 in sealed relationship with the sleeve 54. The disk portion 80 is sufficiently wide to extend outwardly beyond the outer edge of the bearing 50 and is made of any suitable material such as rubber to protect the bearing 50 from rain, snow, sleet and the like.

INSTALLATION AND OPERATION

To install the device of this invention, the entire assembly is positioned with the auger portion 40 extending into the upper portion of the downspout 14. The locking member 74 is then pivoted with respect to the horizontal portion 72 of the bracket 53 about the pin 75 a sufficient amount so that the locking member 74 can be placed over the flange 26 of the gutter 12. With the locking member 74 so positioned, the bracket 53, including the horizontal portion 72, and the remainder of the assembly is pivoted so as to bring the horizontal portion 72 under the flange 26 to a position parallel with the locking member 74. With the mounting bracket 53 in this position, the bracket is tightly secured to the gutter 12 with the auger 40 firmly fixed for rotation within the downspout 14.

As shown in FIG. 2, the shaft 60 should be of sufficient height to allow clearance between the impeller 62 and roof 18. With the device so mounted, wind striking the impeller 62 imparts rotation to the shaft 60, sleeve 54 and auger portion 40 in the counterclockwise direction as shown in FIG. 3. As leaves and other debris are brought in contact with the auger portion 40, the counterclockwise rotation drives the debris downward through the aperture 30 and downspout 14.

Various changes and modifications may be made within the purview of this invention as will be readily apparent to those skilled in the art. Such changes and modifications are within the scope and teaching of this invention as defined by the claims appended hereto.

What is claimed:

1. A device for preventing the accumulation of debris at the mouth of a downspout comprising an auger means extending into the mouth of the downspout, mounting means for rotatably mounting the auger means in the mouth of the downspout, and means for rotating the auger means.

2. The device of claim 1 wherein the rotating means includes means propelled by the wind for imparting rotation to the auger means.

3. The device of claim 1 wherein the auger means is made to rotate in a direction to drive the debris downward through the mouth of the downspout.

4. The device of claim 1 including a shaft means having a lower portion and an upper portion, an auger formed about the lower portion of the shaft means, means for mounting the auger means for rotation within the downspout with the upper portion of the shaft means extending above the mouth of the downspout, an impeller, and means for mounting the impeller to the upper portion of the shaft means, whereby the wind imparts rotation to the impeller which in turn imparts rotation to the auger within the mouth of the downspout.

5. The device of claim 4 wherein the impeller is a generally S-shaped fin.

6. The device of claim 4 wherein the impeller and auger are constructed so as to cause the auger to rotate in a direction to drive the debris downward through the mouth of the downspout.

7. The device of claim 6 wherein a portion of the auger extends above the mouth of the downspout.

8. The device of claim 1 wherein the mounting means includes a mounting bracket, and a bearing means within the mounting bracket for mounting the auger means in rotational engagement with the mounting bracket.

9. The device of claim 8 including a shielding means above the bearing means for protecting the bearing means from precipitation.

10. The device of claim 1 including a gutter associated with the downspout, and means for securing the mounting means to the gutter for rotation of the auger means within the mouth of the downspout.

11. The device of claim 10 wherein the gutter has a flange at the top of its front wall, and the securing means includes a bracket having a locking member that fits over the flange.

12. A device for preventing the accumulation of debris at the mouth of a downspout comprising a driving means rotatably mounted within the mouth of the downspout, and means responsive to the wind for rotating the driving means so as to drive the debris in a downward direction.

* * * * *